United States Patent
Schmidt et al.

(10) Patent No.: US 9,002,598 B2
(45) Date of Patent: Apr. 7, 2015

(54) METHOD FOR DETERMINING CHARACTERISTICS OF AN AUTOMATIC TRANSMISSION

(75) Inventors: Thilo Schmidt, Meckenbeuren (DE); Valentine Herbeth, Friedrichshafen (DE); Klaus Steinhauser, Kressbronn (DE); Jorg Arnold, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 321 days.

(21) Appl. No.: 13/440,169

(22) Filed: Apr. 5, 2012

(65) Prior Publication Data
US 2012/0273318 A1    Nov. 1, 2012

(30) Foreign Application Priority Data
Apr. 26, 2011   (DE) .......................... 10 2011 017 515

(51) Int. Cl.
| | |
|---|---|
| *B60W 10/02* | (2006.01) |
| *B60W 10/10* | (2012.01) |
| *G01M 13/02* | (2006.01) |
| *F16H 59/46* | (2006.01) |
| *F16H 61/06* | (2006.01) |
| *F16H 59/38* | (2006.01) |

(52) U.S. Cl.
CPC ............. *G01M 13/022* (2013.01); *F16H 59/46* (2013.01); *F16H 61/061* (2013.01); *F16H 2059/385* (2013.01); *F16H 2059/467* (2013.01); *F16H 2342/04* (2013.01); *F16H 2342/044* (2013.01)

(58) Field of Classification Search
CPC .......... F16H 2342/044; F16H 2342/04; F16H 2059/467; F16H 2059/385; F16H 61/061; F16H 59/46; G01M 13/022
See application file for complete search history.

(56) References Cited

U.S. PATENT DOCUMENTS

| | | | | |
|---|---|---|---|---|
| 5,580,332 | A | * | 12/1996 | Mitchell et al. ............... 477/143 |
| 5,737,979 | A | * | 4/1998 | McKenzie et al. ........... 74/731.1 |
| 6,155,948 | A | | 12/2000 | Gierer |
| 7,468,016 | B2 | * | 12/2008 | Miyake et al. .................. 477/53 |
| 8,050,826 | B2 | * | 11/2011 | Miyake et al. .................. 701/51 |
| 2011/0196590 | A1 | * | 8/2011 | Ayabe et al. .................... 701/68 |

FOREIGN PATENT DOCUMENTS

DE    196 43 305 A1    4/1998

* cited by examiner

*Primary Examiner* — John Q Nguyen
*Assistant Examiner* — Alan D Hutchinson
(74) *Attorney, Agent, or Firm* — Davis & Bujold, PLLC; Michael J. Bujold (57) ABSTRACT

A method of determining a fill current value of at least one frictionally engaging shift element of an automatic transmission. The automatic transmission includes a hydrodynamic converter at which a speed ratio arises and an output shaft. In a control sequence, with a stationary output shaft, the speed ratio is influenced by changing a control current, and the fill current value is determined from the progression of the speed ratio arising during the control sequence, in conjunction with the progression of the control current.

12 Claims, 6 Drawing Sheets

METHOD FOR DETERMINING CHARACTERISTICS OF AN AUTOMATIC TRANSMISSION

This application claims priority from German patent application serial no. 10 2011 017 515.6 filed Apr. 26, 2011.

FIELD OF THE INVENTION

The invention relates to a method for determining characteristics of an electrohydraulically controlled automatic transmission.

BACKGROUND OF THE INVENTION

In order to provide the transmission ratios, automatic transmissions for motor vehicles comprise several frictionally engaging shift elements, which can, for example, transfer torque under a hydraulic pressure. With the amount of the pressure, which is also known as the clutch pressure, the shift element halves are pressed against each other with an increasing force, if the shift element is disengaged in a pressureless state. As a result, the amount of torque that can be transferred by the frictionally engaging shift element, which in the following is designated as the transfer capability, increases. An increase of transfer capability is therefore understood to be an increase of the torque that can be transferred by the shift element. Transfer capabilities start when the volume of the shift element is filled and the friction surfaces of the shift element halves are in contact with each other. With the contact, torque is transferred and at the same time there is slippage of the shift element, that is, there is a dynamic friction between the shift element halves. With increasing pressure, the contact pressure of the shift element halves on each other increases, and thus also the transferable frictional torque. This applies in an analogous manner to shift elements that are actuated by a different active energy, for instance, frictionally engaging shift elements that are engaged electromechanically.

The different transmission ratio steps of an automatic transmission are created when different shift elements are engaged in specific combinations, and thereby connect, in a rotationally fixed manner, the different elements of a planetary gear set to each other or lock these elements. In order to achieve good shifting comfort during gear changes, also called gear transitions, a shift element, which is to be newly engaged, must not be pressurized abruptly, but rather the buildup of pressure must increase steadily. In order to guarantee a steady increase of the transfer capability of a frictionally engaging shift element, the pressure is increased in a defined ramp-like progression. The pressure is adjusted using an electronic transmission control unit (EGS), which outputs an electrical current as a control variable and thereby controls an electrohydraulic gearshift device (HSG), which thereupon sets a specific pressure, depending on the value of the current, by means of an electrical pressure regulator (EDS). It should be noted that the current-pressure correlation can be different for each pressure regulator due to the manufacturing tolerances of the pressure regulator.

In order to be able to reproducibly set the desired pressure ramp, it is necessary to have precise knowledge of the correlation of current, which controls the EDS, and pressure generated by the EDS.

The value of the current required for generating a specific clutch pressure can be determined from a table stored in the EGS or calculated from the desired clutch pressure using a mathematical function. The mathematical function is a polynomial, for example. Specific characteristic values, designated also as compensation data, must be known in order to define the polynomial or the table; for example, a fill current, which is issued by the EGS and conducted to the electrical pressure regulator in the hydraulic gearshift device, which then generates a fill pressure in the hydraulic system or in the shift elements. The fill pressure is attained when the shift element, for example a hydraulic clutch or brake, is filled to the extent that a specific pressure has been built up and the friction surfaces of the shift element have approached each other to the extent that the transfer of a torque begins.

The fill pressure, which can differ for each shift element within an automatic transmission depending on the geometric shape, is therefore associated with a specific value of the fill current. In this context, the experimentally determined fill pressure is identical for all shift elements of the same shape, even if these elements are disposed in different transmissions of the same type.

Transmission concepts are known that have a mechatronic system. A mechatronic system is a rigidly installed assembly that substantially comprises an HSG and an EGS. It is possible to compensate for tolerances in the current-pressure correlation of the electrical pressure regulator, for example, by means of compensation data handling, and thereby to be able to use inexpensive pressure regulators for high shift quality of new vehicles.

In contrast, in the case of separate HSG and EGS components, such compensation data handling is not possible in the event of a subsequent exchange of one or both components in the field.

A method for determining characteristics of an automatic transmission is known from the document DE19643305 A1. For this, an automatic transmission on a final test bench is shifted into the individual transmission ratio steps, wherein an input and output transmission speed and an input and output transmission torque are measured. For example, a fill time, a fill pressure, a reaction time or a friction value of the plates are determined from these measured values as characteristic values of the automatic transmission such for the clutch to be engaged during shifting. These characteristic values are then stored in a memory so that an electronic transmission control device can correct the pressure level and the time of a rapid filling pressure, of the fill pressure and the pressure level of a shift pressure based on these characteristic values. In this method, the fill pressure, for example, is determined in that, with the automatic transmission driven, the pressure level in the respective shift element is increased until the output torque exceeds a defined limit value.

A disadvantage here is that torque measurement requires expensive measurement equipment and sensors. In addition, such a measurement can occur only on a test bench using a transmission that has been removed from the vehicle, which is not service-friendly and is expensive with respect to the installation effort and costs for an application in the field or service sector.

SUMMARY OF THE INVENTION

The problem addressed by the invention is to specify a method for determining with minimal effort the characteristic values of an automatic transmission, in particular, the fill current values of different frictionally engaging shift elements, and thus the compensation data between the shift elements and the components that control the shift elements. In particular, the method should make it possible to determine the compensation data in the case of an exchange of one or both components, without having to remove the automatic transmission from the vehicle.

A method is specified for determining characteristic values of frictionally engaging shift elements of an automatic transmission. The automatic transmission comprises at least one frictionally engaging shift element, an output shaft and a hydrodynamic drive element. The hydrodynamic drive element comprises a pump impeller that is rotationally fixed to a drive motor, and a turbine rotor. The turbine rotor can be coupled in a rotationally fixed manner, or subject to slip, to an output shaft by means of a frictionally engaging shift element. The pump impeller, rotating at an engine speed, and the turbine rotor, rotating at a turbine speed, are effectively connected hydrodynamically. The power transfer from the pump impeller to the turbine rotor takes place due to a momentum exchange using an operating fluid that is located within the hydrodynamic drive element. Depending on the operating point, the turbine speed and an engine speed differ, wherein the turbine speed cannot be faster than the engine speed. Due to the difference, a quotient of the turbine speed and engine speed forms a changeable speed ratio. The transfer capability of the frictionally engaging shift element can be changed by controlling a gearshift device by means of an electrical control current. Here, the transfer capability of the frictionally engaging shift element refers to the value of the torque that can be transferred by the shift element. For every frictionally engaging shift element there is a fill current value at which this shift element, starting from a disengaged state, transitions into a state of torque transfer subject to slip, or conversely, i.e., at which the frictionally engaging shift element, starting from a state of torque transfer subject to slip, transitions into the disengaged state.

With the output shaft fixed, the transfer capability of the respective frictionally engaging shift element and thus the speed ratio can be influenced by changing the control current of the respective frictionally engaging shift element in a control sequence. The fill current value of the frictionally engaging shift element is determined from the progression of the speed ratio resulting during the control sequence in connection with the progression of the control current.

Due to the change of the transfer capability of the frictionally engaging shift element, the turbine speed changes whilst the engine speed is constant during the control sequence. Thus, it would be theoretically possible to determine the fill current value only from the progression of the turbine speed. However, if during the control sequence the engine speed fluctuates, the turbine speed changes as well, even if it is not yet influenced by the change of the transfer capability. Thus, capturing only the turbine speed for the purpose of determining the fill current value can lead to erroneous interpretations.

However, if the speed ratio is used as an indicator for the change of the transfer capability of the frictionally engaging shift element, this does not change merely with fluctuations of the engine speed. But with the described test set up, during a change of the transfer capability of the frictionally engaging shift element, a deviation results between the engine speed and turbine speed, and therefore a change in the speed ratio also results. Thus, erroneous interpretations due to the speed fluctuations are advantageously excluded from the determination of the fill current value. A further advantage of the method according to the invention, since it is possible to determine the fill current value based on the speed ratio, is a simple measurement setup, because only the speeds of the engine and turbine need to be measured in the automatic transmission. The appropriate speed sensors are already disposed in the automatic transmission such that no additional expense for sensors or the installation thereof is required.

Advantageous embodiments of the invention will become apparent from the dependent claims.

In an advantageous embodiment of the method, the transfer capability of the frictionally engaging shift element is influenced by hydraulic clutch pressure acting on the element. Here, the control current acts on a hydraulic control device, which adjusts the value of the clutch pressure.

It is possible that with an increase of the control current, the clutch pressure is increased, wherein the increase of the clutch pressure acts to engage the frictionally engaging shift element, or increases the transfer capability thereof, and a reduction of the clutch pressure acts to disengage the frictionally engaging shift element, or reduces the transfer capability thereof. This has the advantage that the transition from the disengaged state of the frictionally engaging shift element into a state in which the shift element is subject to slip, that is, transfers torque with dynamic friction, can be set to the desired shifting operation by means of the hydraulic control device.

In an advantageous embodiment of the method, the starting state for the control sequence for determining the fill current value of the frictionally engaging shift element is set as an operating state in which, of several shift elements to be shifted in order to provide a transmission ratio step, only the frictionally engaging shift element for which the fill current value is to be determined is disengaged. The remaining shift elements, which can be frictionally engaging shift elements or form-locking shift elements, are engaged. A pump impeller of the hydrodynamic drive element, connected rotationally fixed to the drive motor, is driven at an engine speed. At the hydrodynamic drive element, a starting value for the transmission ratio that is greater than zero and less than the value "1" results, because due to the drag losses, even without load, the turbine rotor also rotates more slowly than the pump impeller. In the control sequence, the transfer capability of the frictionally engaging shift element is increased by increasing the control current so that the speed ratio is reduced. Through gradually increasing the clutch pressure by means of increasing the control current over time, the frictionally engaging shift element can be transitioned from the disengaged state into its state of torque transfer subject to slip in a defined procedure, and with high temporal resolution.

Alternatively, however, it is possible that all of the shift elements required for delineating a transmission ratio are engaged before the start of the control sequence such that the turbine rotor is connected in a rotationally fixed manner to the fixed output shaft. As a result, the starting value of the speed ratio equals zero. In the control sequence, the transfer capability of the frictionally engaging shift element is constantly reduced by lowering the control current so that the speed ratio increases. In this embodiment, the method has the advantage that the starting value of the speed ratio can be set in a reproducible manner. Additionally, standard software that is also used in normal driving operation can be used for controlling the shift elements all of which are to be engaged as in the selection for the appropriate transmission ratio step to be selected.

In an advantageous embodiment of the method according to the invention, as an evaluation criterion for determining the fill current value, a specific value of the speed ratio is defined as a threshold value, wherein the fill current value to be determined corresponds to the value of the control current at which the speed ratio, starting from a defined starting value in the control sequence, corresponds to the defined threshold value. The criterion of the threshold value has the advantage that the evaluation is simple, because only the measured values at the same point in time must be compared.

In this context, a speed ratio difference between the starting value of the speed ratio and the threshold value can be selected to be at least sufficiently large that it is greater than the fluctuations, occurring due to technical conditions, of the starting value of the speed ratio that is set constant before the control sequence. As a result, falsely interpreting a fluctuation in the speed ratio as the start of the transfer capability of the frictionally engaging shift element, and thus falsely determining the value of the fill current, is advantageously avoided.

Alternatively, in the control sequence for changing the control current in order to change the transfer capability of the respective shift element, the speed ratio can be increased or decreased beginning from a starting value, and the resulting progression can be divided into two sections. Here, a first section of the progression with a constant speed ratio is described or approximated by a first straight line, and a second section by a second straight line. A point of intersection of the two straight lines is calculated from the equations of the two straight lines, wherein the coordinates thereof specify the starting value of the speed ratio and the fill current value to be determined. As a result, the point in time, or the control current value at which the speed ratio changes in the control sequence, can be objectively determined.

In a particularly advantageous embodiment of the method, the control sequence is discontinued as soon as the fill current value is determined. This offers the advantage of time-saving in determining the fill current value, particularly for an automatic transmission having multiple frictionally engaging shift elements for each of which an individual fill current value is be determined.

In a further advantageous embodiment, the fill current value is determined for an automatic transmission installed in a vehicle. Advantageously, no costly removal of the transmission and measurement on a transmission test bench are required.

It is possible to design the hydrodynamic drive element as a hydrodynamic torque converter.

As an alternative to this, it is possible to design the hydrodynamic drive element as a hydrodynamic clutch.

BRIEF DESCRIPTION OF THE DRAWINGS

Exemplary embodiments of the method according to the invention are represented in the figures and are described in more detail in the following.

They show:

FIG. 1a a schematically represented gear set and shift elements of an automatic transmission, FIG. 1b the shift elements to be engaged to implement different transmission ratio steps in a tabular form, FIG. 2 a schematic representation of an automatic transmission, FIG. 3 a schematic representation of an automatic transmission with the shift elements to be controlled, FIG. 4 a temporal progression of the transmission values during a control sequence for a first method variant, FIG. 5 a progression of the speed ratio plotted against the control current with a first evaluation criterion for a first method variant, FIG. 6 a progression of the speed ratio plotted against the control current with a second evaluation criterion for the first method variant, FIG. 7 a temporal progression of the transmission values during a control sequence for a second method variant.

DETAILED DESCRIPTION OF THE PREFERRED EMBODIMENTS

Figure 1A:
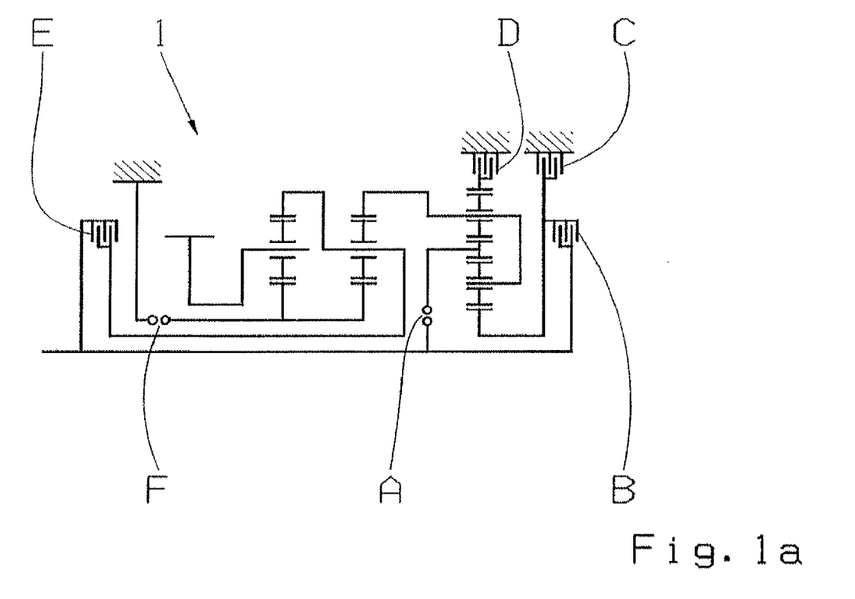
Figure 1B:
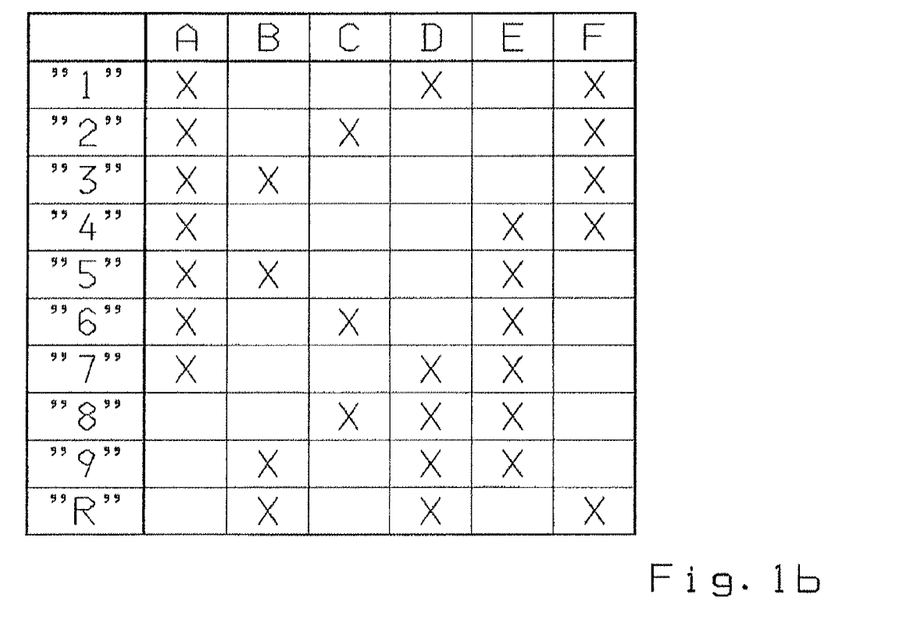

FIG. 1a shows an example of the gear set pattern of an automatic transmission 1 with frictionally engaging and form-locking shift elements. The frictionally engaging shift elements B, C, D and E are also referred to as friction clutches. The form-locking shift elements A and F are also referred to as claw clutches. As seen in the table in FIG. 1b, the nine possible gear steps are provided in each case by shifting, or engaging, three shift elements. In the gears "1" to "4", in each case, the two claw shift elements A and F are engaged, so that a frictional connection is attained in the gears "1" to "4" by shifting one of the four frictionally engaging shift elements B, C, D, E. The method according to the invention is described using the example of the fourth gear. It could, however, also be described based on any other gear in which at least one frictionally engaging shift element is involved, i.e., in the present case in any gear.

Figure 2:
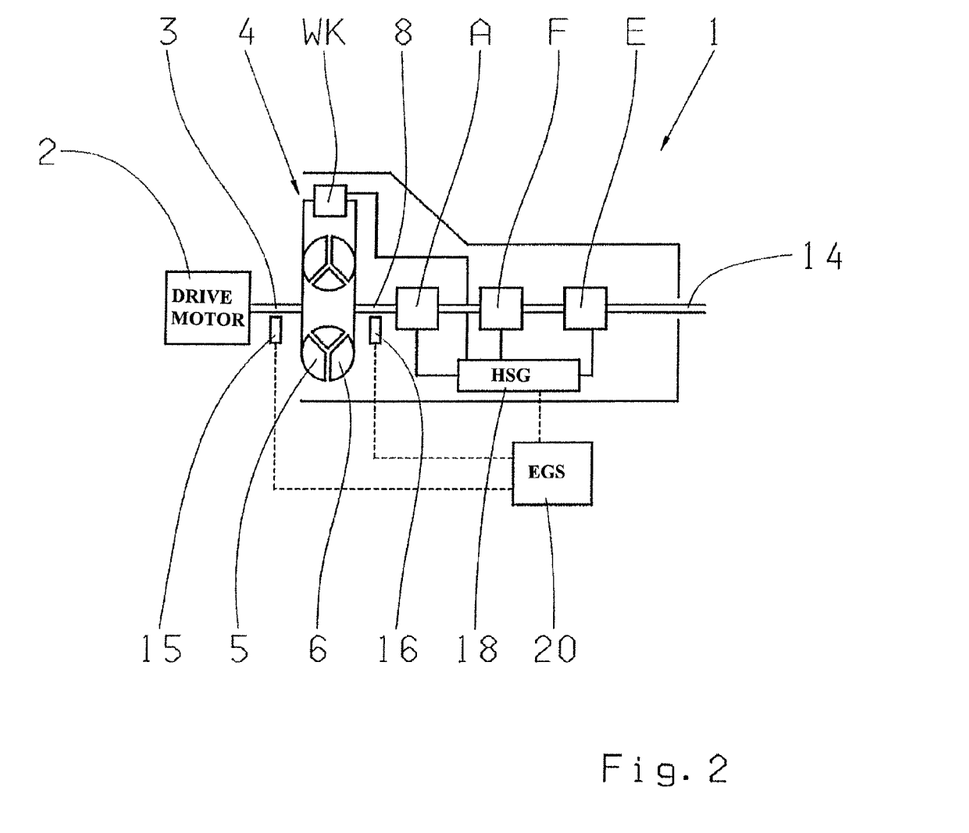

FIG. 2 shows an automatic transmission 1 which is driven, via a drive shaft 3, by a drive motor 2 preferably an internal combustion engine. In this case, the drive shaft 3 is connected in a rotationally fixed manner to a pump impeller 5 of a hydrodynamic torque converter 4. Thus, the speed of the pump impeller 5 equals the engine speed $n\_M$. Using a hydrodynamic momentum exchange, the pump impeller 5 can also drive a turbine rotor 6 likewise encompassed by the hydrodynamic torque converter 4. Due to the hydrodynamically effective connection, a speed difference, also designated as slip, develops between the pump impeller 5 or the drive motor 2, and the turbine rotor 6. The value of the slip is described by a speed ratio ν which is calculated as a ratio of a turbine speed $n\_T$, which is also the speed of a transmission input shaft 8 that is connected in a rotationally fixed manner to the turbine rotor 6, and an engine speed $n\_M$, thus ($\nu = n\_T/n\_M$), and cannot exceed a theoretical value of $\nu = 1$. As an alternative to the torque converter 4, a different hydrodynamic drive element, for instance a hydrodynamic clutch, can be disposed between the drive motor 2 and the transmission input shaft 8. The turbine speed $n\_T$ and the engine speed $n\_M$ are measured respectively by a speed sensor 15 or 16, and captured in an electronic transmission control unit 20. A converter lock-up clutch WK which is preferably designed as a frictionally engaging shift element, is optionally disposed between the pump impeller 5 and the turbine rotor 6. If this converter lock-up clutch is completely engaged under a hydraulic pressure, then the pump impeller 5 and turbine rotor 6 are connected in a rotationally fixed manner and without slip, and the speed ratio ν assumes a value of $\nu = 1$. For the following consideration, the converter lock-up clutch WK should be view as disengaged, or as not present.

Shift elements A, F and E are disposed between the turbine rotor 6 and an output shaft 14. In the present example, the shift elements A and F can be designed both as form-locking shift elements (claw clutches) and as frictionally engaging shift elements (friction clutches). The shift element E is implemented as a frictionally engaging shift element. The turbine rotor 6 can be coupled in a rotationally fixed manner to the output shaft 14 by engaging the shift elements A, F and E of the automatic transmission 1. In the representation shown, all three shift elements A, F and E are to be engaged in order to create the frictional connection between the turbine rotor 6 and the output shaft 14, whereby in this example the fourth gear, i.e., one of several possible transmission ratio steps of the automatic transmission, is selected. For a different transmission ratio step a different combination of shift elements (FIG. 1b) is to be engaged, which however is not represented. Depending on the transmission ratio step, there is a specific transmission ratio between the turbine speed $n\_T$ and an output speed $n\_AB$. The hydraulic pressurization for engaging the shift elements, in this example the shift elements A, F, and E, occurs with a clutch pressure $p\_K$ by means of an oil supply system, of which only the electrohydraulic control device 18 is represented. This device comprises control and shift valves, not represented, which in turn, are switched or pressurized by means of electrical pressure regulators, also not shown. The amount of clutch pressure p_K set by the electrical pressure regulators depends on the value of an electrical control current i_EDS with which the electrical pressure regulators, which are preferably designed as solenoid valves, are controlled. An electronic transmission control unit 20 sets the value of the control current that is conducted via an electrical connection, represented by a dotted line, to the electrohydraulic control device 18. The electrohydraulic control device 18 is connected by means of hydraulic connections, represented by solid lines, to both the shift elements for the transmission steps as well as to the converter lock-up clutch WK. Depending on the control of the different electrical pressure regulators, different combinations of shift elements are controlled in order to provide the different transmission ratio steps. Furthermore, during a shift procedure, i.e., a change of the transmission ratio step, the newly added frictionally engaging shift element(s) are controlled with a pressure that changes overtime. The progression of the pressure is influenced by a control current that can be changed over time, wherein the function of the control current over time, preferably an increasing pressure ramp, is stored in the electronic control device. Form-locking shift elements are engaged by a simple activation of the appropriate pressure without a controlled pressure-time function.

An important variable for guaranteeing comfortable shift behavior, that is, a shift behavior that is free of torsional impulses, is the knowledge of a fill pressure p_K_F, which is individually determined for each frictionally engaging shift element. The fill pressure p_K_F is the pressure at or above which a frictionally engaging shift element starts to be able to transfer torque, and was experimentally determined in the application. It depends on the geometry and the spring characteristics of the respective clutch, and in practice is equal for all structurally identical shift elements. If precisely this pressure is set for a gear change, the pressure buildup and thus the torque build up occur steadily and free of torsional impulses, whereby the shift behavior is considered to be comfortable.

The fill pressure p_K_F is set by means of a specific fill current value i_EDS_F. A correlation of the fill current i_EDS_F to the fill pressure p_K_F is found in a table that is stored in the EGS. This correlation was determined on an acceptance test bench during the assembly of the transmission.

In practice, the electrical pressure regulators have tolerances, whereby depending on the electrical pressure regulator, a different clutch pressure p_K results at the same value of the control current i_EDS. If a defective electronic control device, or a defective electrohydraulic gearshift device, or both components, are now exchanged in the field, or in service in a workshop, and if the originally determined fill current is set, a pressure could now be set in the shift element that does not correspond to the desired value of the fill pressure. As a result, the quality of the shift behavior would be negatively impacted.

The method according to the invention now allows adapting the components to each other as a learning procedure after an exchange of the components, in that a new fill current value i_EDS_F is determined which generates the correct fill pressure p_K_F. The method is performed in two embodiments. Common to both variants of the method is, among others, that starting from a defined starting state, a control sequence is started in which changing the control current i_EDS, which controls the respective electrical pressure regulator, influences the transfer capability of the shift element, for which a fill current value is to be determined.

In a first variant of the method, the transfer capability of the frictionally engaging shift element is increased over time in the control sequence, and in a second variant of the method, the transfer behavior of the frictionally engaging shift element is lowered.

Figure 3:
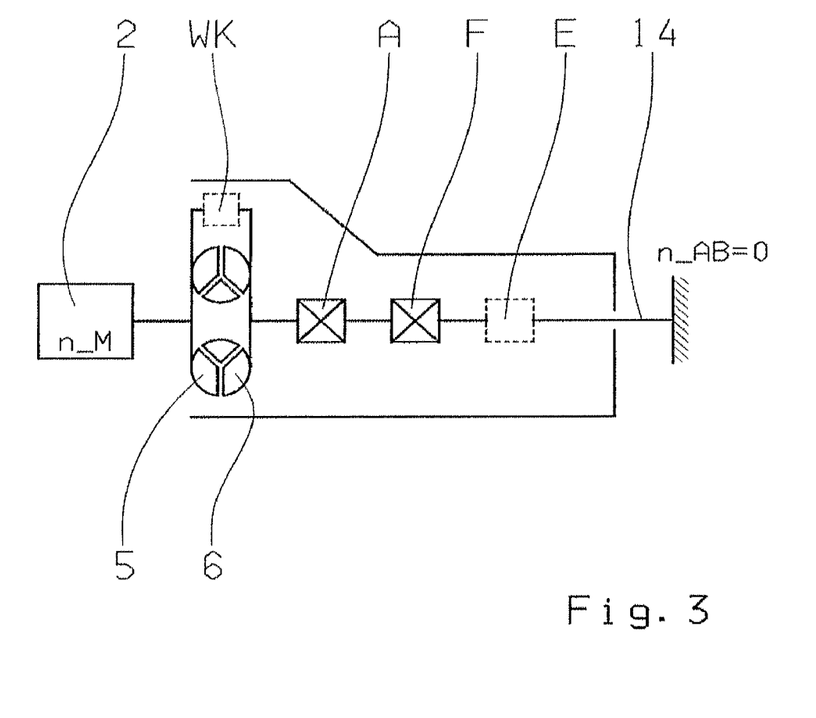

The control sequence for the learning procedure can be started only when the following conditions are simultaneously satisfied: The vehicle when parked using the parking brake, or the parking lock, such that the output shaft 14 is stationary, as shown in FIG. 3, and as a result, the output speed n_AB=0. Both the oil temperature and the engine speed n_M must each be within a respectively acceptable range. The form-locking shift elements A and F, which together with the frictionally engaging shift element E represent the respective transmission ratio step, must be engaged. The frictionally engaging shift element E, for which the fill current value i_EDS_F is to be determined, is disengaged. This is shown in FIG. 3 by the crossed out symbols (engaged shift element) and the solid symbols (disengaged shift element). In the process, the form-locking shift elements are to be engaged using a specific synchronizing function. The converter lock-up clutch WK is disengaged, which is symbolized by the dotted lines.

Figure 4:
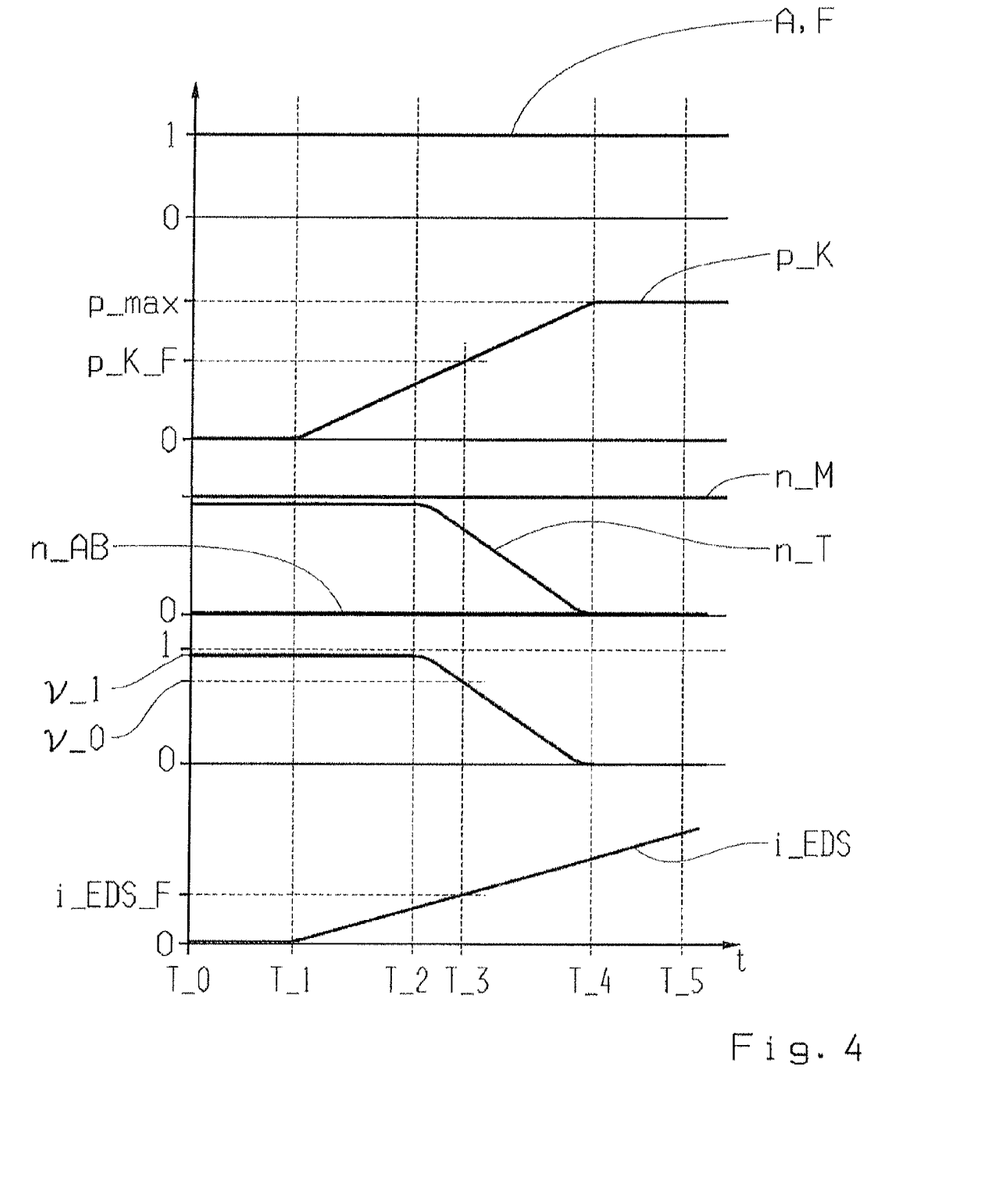

FIG. 4 shows the temporal progression of the relevant variables during a control sequence for the first variant of the method. Here, the progressions of the engine speed n_M, the turbine speed n_T, the shift states of the form-locking shift elements A and F, the clutch pressure p_K of the frictionally engaging shift element E, the control current i_EDS, and the speed ratio v are represented over time, but not to scale.

At a time T_0, the shift elements A and F, which are form-locking in the example shown, are engaged, wherein the engaged state is represented on the Y-axis with the value "1". The frictionally engaging shift element E, for which the fill current value i_EDS_F is to be determined, is disengaged, which is represented by the value of a clutch pressure p_K=0. The output shaft 14 is blocked so that the output speed n_AB takes on a constant value of n_AB=0 1/min during the control sequence. The engine speed n_M of the drive motor 2 is set to a constant value.

The drive motor 2 drives the pump impeller 5, which rotates due to the rotationally fixed connection to the drive motor 2, at the engine speed n_M. Because the shift element E is disengaged, the drive motor 2 rotates the turbine rotor 6 by means of the hydrodynamic momentum exchange of the torque converter 4, and thus the transmission input shaft 8 that is connected in a rotationally fixed manner thereto, without load. The torque converter 4 is minimally loaded due to the drag torques acting on the transmission input shaft 8 and in the frictionally engaging shift element E. As a result of this, a speed difference arises between the pump impeller 5 driven at the engine speed n_M and the turbine impeller 6. The transmission input shaft 8, which is connected in a rotationally fixed manner to the turbine impeller 6 thus also rotates at the turbine speed n_T, which lies slightly below the engine speed n_M. Due to the slight speed difference between the engine speed n_M and the turbine speed n_T, a speed ratio v=n_T/n_M arises that lies slightly below the value v=1. Aside from that, not represented in the graph, the oil temperature and the engine speed n_M must be within a respectively acceptable range, as was described for FIG. 3.

Starting from the named constant conditions, the control sequence is started at time T_1. In the process, the control current i_EDS is increased linearly over time, that is to say, with a ramp-shape. Consequently, the clutch pressure p_K of the shift element E increases. Initially, the shift element E is filled with the operating medium, which is oil in this example. The pressure that then builds up reduces the clutch play that is present, against an elastic preload. After the clutch play is eliminated, the friction elements of the frictionally engaging shift element E approach each other, and torque transfer that is subject to slip begins, which is also designated as the start of the transfer capability.

In the graph, a first decrease of the turbine speed $n\_T$, or the speed ratio $v$, can be recognized at time $T\_2$. Due to the start of the transfer capability of the frictionally engaging shift element E, the torque against which the torque converter 4 drives the turbine rotor 6 or the transmission input shaft 8 increases, whereby the turbine speed $n\_T$ decreases. The speed ratio $v$ also decreases over time, because the engine speed $n\_M$ remains constant. However this does not serve as a criterion indicating that the clutch pressure $p\_K$ has attained the fill pressure $p\_K\_F$, or that the frictionally engaging shift element E is transitioning from a disengaged state into a state of torque transfer subject to slip.

The reason for this is that an erroneous interpretation of the progression of the speed ratio $v$ is possible due to fluctuations of the engine speed $n\_M$ and/or turbine speed $n\_T$. For this reason, a threshold value $v\_0$ is defined, which is selected such that the difference thereof from the starting value $v\_1$ is greater than possible fluctuations of the speed ratio $v$ that can result for instance from measurement or control inaccuracies. The objective criterion for the start of the transfer capability of the frictionally engaging shift element E is thus passing through or falling below the threshold value $v\_0$, which occurs at time $T\_3$. The value of the control current $i\_EDS$ that controls the electrical pressure regulator at time $T\_3$ is consequently the fill current value $i\_EDS\_F$ to be determined, of the shift element E that is presently engaging. Because the change of the speed ratio $v$ serves in the evaluation of the control sequence as an indicator for the start of the transfer capability of the frictionally engaging shift element E, a measurement of the clutch pressure $p\_K$ is advantageously not required.

In the diagram shown in FIG. 4, the turbine speed $n\_T$ could also be used as a relevant variable for determining the fill current value $i\_EDS\_F$ of the frictionally engaging shift element E, because the engine speed $n\_M$ is constant. In practice however, the control could cause fluctuations of the engine speed $n\_M$, which are transferred to the turbine speed $n\_T$ and could be erroneously interpreted as the start of the transfer capability of the frictionally engaging shift element E. In order to avoid this, the speed ratio $v$ is advantageously used as a relevant variable for determining the fill current value $i\_EDS\_F$, because at the start of the transfer capability of the frictionally engaging shift element E the speed difference between the pump impeller 5 and the turbine rotor 6 changes, and with it the speed ratio $v$.

The control current $i\_EDS$ is further increased with a ramp shape until the frictionally engaging shift element E is completely engaged at the clutch pressure $p\_K=p\_max$, and the turbine rotor 6 is connected in a rotationally fixed manner to the stationary output shaft 14 such that the turbine speed $n\_T$ and with it the speed ratio $v$ take on the value zero at time $T\_3$. In theory, the turbine rotor 6 or the transmission input shaft 8 can also be blocked already at a lower clutch pressure $p\_K$ than $p\_max$, depending on the amount of torque to be braked in the torque converter 4. The control current $i\_EDS$ can theoretically be increased further until a time $T\_5$ for example, without further increases in the clutch pressure $p\_K$, because the clutch pressure is hydraulically limited to the pressure $p\_max$, for example by a pressure relief valve.

A mathematical evaluation can be performed using the correlation of the speed ratio $v$ to the control current $i\_EDS$ from the temporal representation, as shown in FIG. 4.

The temporal progression of the relevant measured variables are recorded and evaluated in the electronic transmission control unit. Thus, for the time $T\_3$, at which the speed ratio $v$ reaches the threshold value $v\_0$, the value of the control current $i\_EDS$ set at this point in time is determined, which is the sought-after fill current value $i\_EDS\_F$.

Because the sought-after fill current value $i\_EDS\_F$ can in fact already be determined as of the time $T\_3$, it is possible to stop the control sequence at this point. This has the advantage of significantly reducing the time required for determining the fill current values of the different frictionally engaging shift elements of an automatic transmission.

Another possibility is a direct correlation of control current $i\_EDS$ and speed ratio $v$ in a graph. Thus, the speed ratio $v$ as a function of the control current $i\_EDS$, ($v=f(i\_EDS)$) can be recorded and evaluated according to two criteria as shown in the following with FIGS. 5 and 6.

Figure 5:
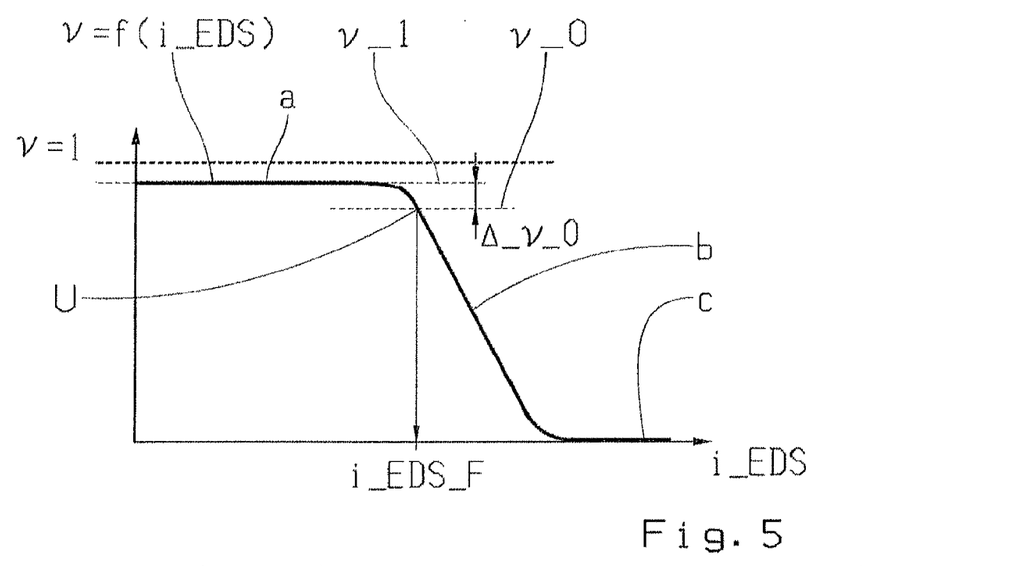
Figure 6:
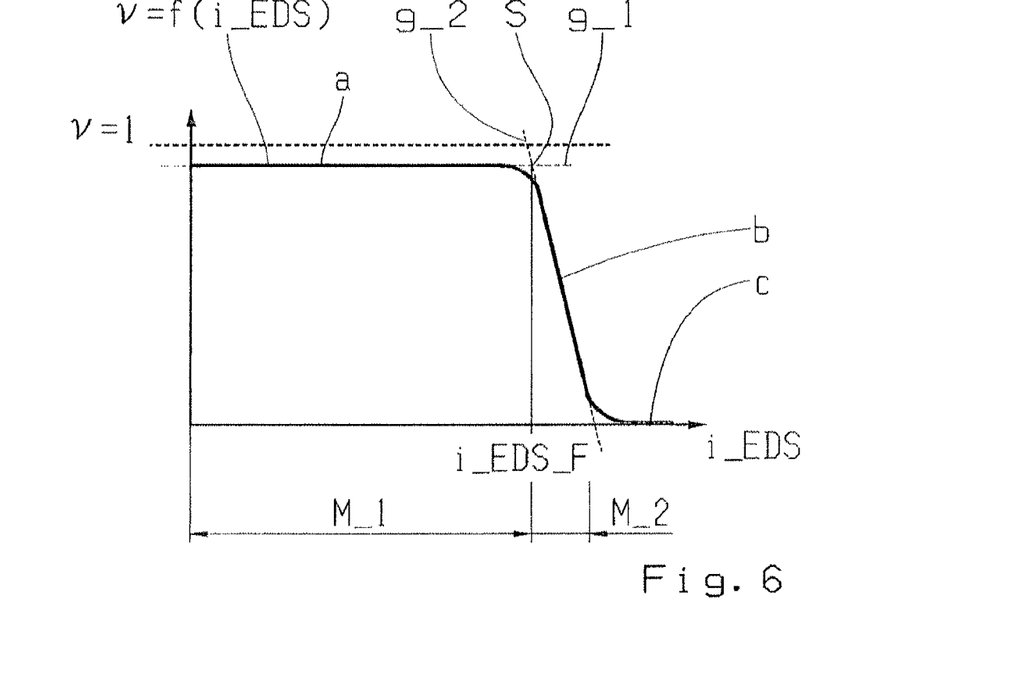

Here, the evaluation of the relationship $v=f(i\_EDS)$, of the progression of the speed ratio $v$ as a function of the control current $i\_EDS$ for determining the fill current $i\_EDS\_F$ can occur in two ways. In each case, an objective criterion must be determined to decide from which value of the control current $i\_EDS$, the curve of the speed ratio $v=f(i\_EDS)$ decreases, and the frictionally engaging shift element E transitions from a state of torque transfer subject to slip into a disengaged state. This value is the fill current value $i\_EDS\_F$ to be determined.

FIG. 5 shows a variant of evaluating the decreasing curve of the speed ratio $v$ for determining the fill current value $i\_EDS\_F$ according to a first objective criterion. In this case, the criterion for determining the filling of the frictionally engaging shift element E is the curve of the speed ratio $v$ attaining or falling below a threshold value $v\_0$. This threshold value $v\_0$ is given, for example, in percent of the starting value of a maximum speed ratio $v\_1$. Alternatively, a speed ratio difference $\Delta v$ between the starting value $v\_1$ and the threshold value $v\_0$ can be specified, which is calculated as $\Delta\_v=|v\_0-v\_1|$. This speed ratio difference is selected to be large enough that already minor measurement-related fluctuations of the speed ratio $v$ are not erroneously interpreted as being a complete filling of the frictionally engaging shift element E, and therefore are not interpreted as the start of the transfer capability of the frictionally engaging shift element. In practice, a typical value is a threshold value $v\_0=0.9*v\_1$. The fill current value $i\_EDS\_F$ is specified as a coordinate of an intersection point U of the progression of the speed ratio and the constant line of the threshold value $v\_0$.

A second criterion for evaluation is described in FIG. 6. Here, an equation of a line is determined for each respective progression of the speed ratio $v$, in a first measurement range $M\_1$ for a section a of the progression $v=f(i\_EDS)$ and a second measurement range $M\_2$ for a section b. Then, an intersection point S is calculated for the intersection of a straight line $g\_1$ that is corresponding to, or approaching the section a, and a straight line $g\_2$ that is corresponding to, or approaching the section b. The X-axis value of the intersection point S that is now known is the sought-after fill current value $i\_EDS\_F$.

In principle, this evaluation criterion can also be applied to the temporal progression of the speed ratio $v$ as shown in FIG. 4.

With a further increase of the transfer capability of the shift element E, the turbine rotor 6 or the transmission input shaft 8 is at some point connected in a rotationally fixed manner to the stationary output shaft 14, such that the turbine speed $n\_T$ takes on the value zero, and with it, the speed ratio attained at the end of a section c is calculated as v=0. The engine speed n_M remains constant during this control sequence.

As already mentioned in connection with FIG. 4, due to the drag torques occurring in practice in the automatic transmission 1, the turbine speed n_T is somewhat lower than the engine speed n_M, which results in a speed ratio v that is less than one, which is shown in the graph in FIG. 6 by a curve section a of the progression of the speed ratio. Starting from this steady operating state, a control current i_EDS increasing over time with a ramp-shape is now supplied from the electronic control device 20 to the electrohydraulic gearshift device, and starting with a specific current value, the transfer capability of the frictionally engaging shift element E increases due to increasing pressurization. If the frictionally engaging shift element E is filled to a certain degree, the clutch pressure p_K in the shift element E increases to the extent that a clutch piston contacts a disk packet in the frictionally engaging shift element E, whereby the shift element E can start to transfer torque. The frictionally engaging shift element E transitions from a disengaged state into a state of frictionally engaged torque transfer. The clutch pressure at which this occurs is designated as the fill pressure p_K_F. The control current value at which the fill pressure arises is designated as the fill current i_EDS_F. Because the output shaft 14 is stationary, this results in a braking of the turbine rotor 6, and also of the drive train connected in a rotationally fixed manner thereto, so that the progression of the speed ratio v over the control current i_EDS bends and then decreases, giving rise to the progression of a curve section b. Now, with further increase of the control current i_EDS, the transfer capability or torque at the shifting clutch E increases, and the transmission input shaft 8, or the turbine rotor 6, is further braked with respect to the drive shaft 3, or the pump impeller 5.

The progression of the function v=f(i_EDS) of the speed ratio v over the control current i_EDS, or the temporal progression of the speed ratio and the control current are captured in the electronic control device 20, for example, and evaluated according to the criterion named above and described with FIGS. 5 and 6. The result of the evaluation is the fill current value i_EDS_F.

A disadvantage of this variant of the control sequence is that the filling of the frictionally engaging shift element is time delayed with respect to changing the control current value i_EDS. As a result, it is possible that the determined fill current value i_EDS_F deviates from the actual value. This disadvantage is avoided according to a second variant of the progression of the control sequence that is described in the following based on FIG. 7.

Figure 7:
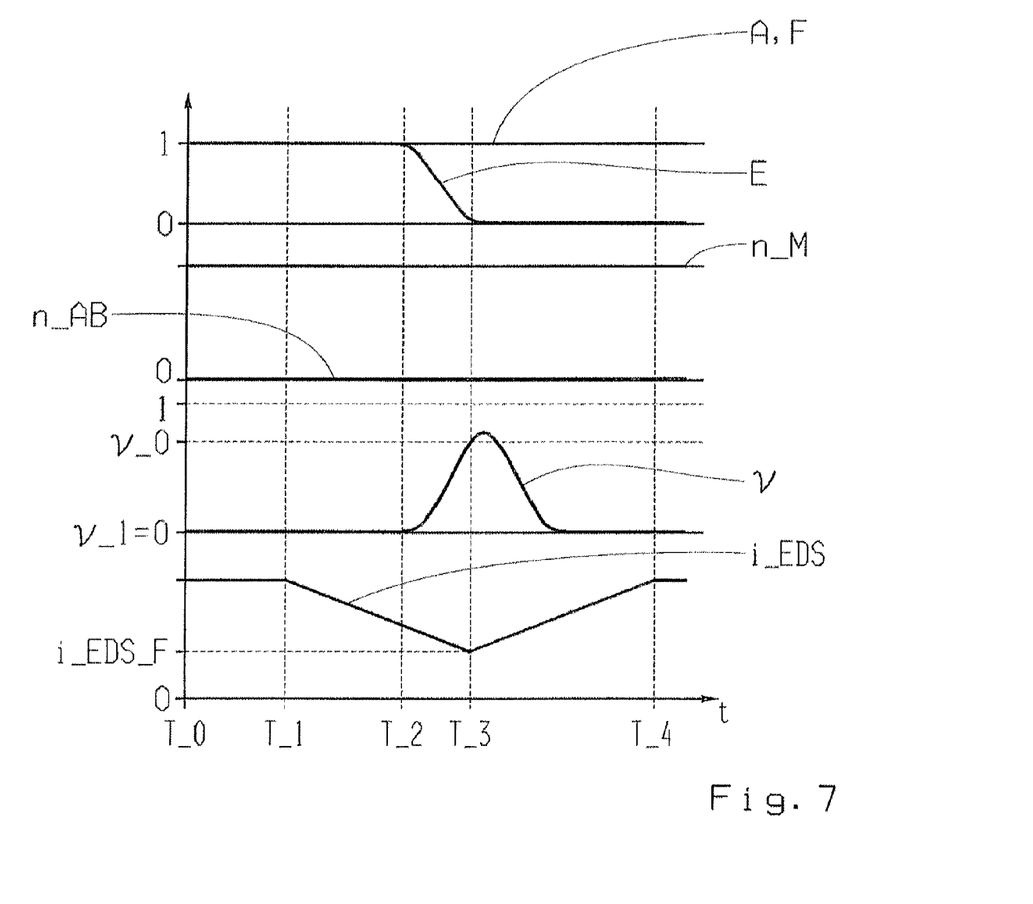

FIG. 7 shows the temporal progression of the relevant transmission variables before and during the control sequence for the second variant of the method for determining a fill current value i_EDS_F for a frictionally engaging shift element E. As described in the context of the first variant, the engine speed n_M and the oil temperature of the transmission must both be in a respectively permissible range before the start of the control sequence. The output shaft 14 is blocked, so therefore, the output speed n_AB=0. A converter lock-up clutch WK, if present, is disengaged.

In contrast to the first variant of the method, which is described in the context of the FIGS. 3-6, in preparation for the control sequence, at a time T_0, not only the frictionally engaging and/or form-locking shift elements A and F are engaged, but also, the frictionally engaging shift element E, for which the fill current value i_EDS_F is to be determined, is engaged. In the graph, the engaged state of a shift element is indicated on the Y-axis with "1", and the disengaged state is indicated with "0". Here, the electrical pressure regulator, assigned to the frictionally engaging shift element E, for generating the necessary clutch pressure p_K is controlled with the control current i_EDS required for engaging the shift element E. Because all three shift elements A, F and E are engaged, the turbine rotor 6 is connected rotationally fixed to the blocked output shaft 14, so that the turbine speed is n_T=0 1/min. As a result, the speed ratio is also zero, v=0, because this is calculated as v=n_T/n_M.

At time T_1, the control sequence is started in that the control current i_EDS is reduced in a linear progression over time. As a result, the clutch pressure p_K in the frictionally engaging shift element E is also reduced, however, the clutch pressure p_K is initially still sufficient to keep the shift element E engaged against the torque generated at the turbine rotor 6 by the drive motor 2 via the torque converter 4. This means that the torque transfer in the frictionally engaging shift element E is free of slippage, i.e., there is static friction between the halves of the clutch of shift element E.

At time T_2, the control current i_EDS and with it the clutch pressure p_K have been reduced so far that the shift element E begins to disengage, and transitions from the engaged state into a state subject to slip, i.e., the torque transfer occurs by means of dynamic friction that exists between the clutch halves of the clutch E. As a result, the turbine speed n_T, or the speed ratio v, increases starting from a starting value v_1=0. At a time T_3, the speed ratio v attains a threshold value v_0. The threshold value v_0 is selected so that this is a reliable indicator that the frictionally engaging shift element E transitions from a state of torque transfer subject to slip into the disengaged state. The value of the speed ratio v is v_0=0.8 in the example shown. The value of the control current i_EDS at the time T_3 is the fill current value i_EDS_F to be determined.

After the threshold value v_0 is reached or exceeded, the temporal progression of the control current i_EDS is reversed, so that this current increases and subsequently affects the frictionally engaging shift element E. The determined fill current value i_EDS_F is stored. In the example shown, the control current i_EDS is increased again linearly over time progressing to the starting value, which is attained at the time T_4.

An advantage of this variant of the method is, as initially mentioned, that due to the decreasing control current over time, and with it, the decreasing filling, or transfer capability, over time, the problem of the time delay between the increasing control current and the thus increasing filling does not occur. Furthermore, it is possible to use as many software standard procedures as possible. Therefore, no special software is necessary for performing a learning procedure, or a control sequence. In addition, the starting value v_1 can be advantageously defined exactly as v_1=0, and can be set reproducibly.

It is generally true for all variants of the method that after the fill currents i_EDS_F are determined, they are assigned to the fill pressure p_K_F known from the application for the respective shift element, or with the knowledge of the fill current, a polynomial is defined, as shown in the following.

The polynomial is a third degree polynomial, for example, with which the current i_EDS can be calculated as function of the clutch pressure p_K. Four coefficients a_0, a_1, a_2 and a_3 must be known for defining the polynomial, as shown in equation A:

$$i\_EDS = a\_0 * p\_K^3 + a\_1 * p\_K^2 + a\_2 * p\_K + a_3 \quad (A)$$

The coefficients a_0, a_1 and a_2 are known.

With the knowledge of the fill current value i_EDS_F, determined using the method according to the invention, of the known correlation of the fill current i_EDS_F to the fill pressure p_K_F, the coefficient a_3 can be calculated. This is substituted into the polynomial, resulting in equation B:

$$i\_EDS\_F = a\_0 * p\_K\_F^3 + a\_1 * p\_K\_F^2 + a\_2 * p\_K\_F + a\_3 \quad (B)$$

The fill current i_EDS_F, fill pressure p_K_F, and the coefficients a_0 to a_2 are known, so that the equation can be solved for the coefficient a_3. The coefficient a_3 is placed into the equation A, which results in a polynomial from which the current value required for setting a specific clutch pressure can be determined.

REFERENCE CHARACTERS 1 automatic transmission
2 drive motor
3 drive shaft
4 hydrodynamic torque converter
5 pump impeller
6 turbine rotor
8 transmission input shaft
14 output shaft
15 speed sensor n_M
16 speed sensor n_T
18 electrohydraulic gearshift device (HSG)
20 electronic transmission control unit (EGS)
A shift element
E frictionally engaging shift element
F shift element
S intersection point
U intersection point
WK converter lock-up clutch
a section
b section
c section
i_EDS control current
i_EDS_F fill current value
M_1 measurement range
M_2 measurement range
n_AB output speed
n_M engine nspeed
n_T transmission input speed
p_K clutch pressure
p_K_F fill pressure
Δ_v speed ratio difference Δ_v=|v_0−v_1|
v speed ratio n_T/n_M
v_0 speed ratio starting value
v_1 speed ratio threshold value
v=f (i_EDS) progression of the speed ratio over the control current

The invention claimed is:

1. A method for determining characteristic values (i_EDS_F) of frictionally engaging shift elements (E) of an automatic transmission (1), the automatic transmission comprising at least one frictionally engaging shift element (E), an output shaft (14), a hydrodynamic drive element (4) which comprises a pump impeller (5) that is connected, in a rotationally fixed manner, to a drive motor (2) and a turbine runner (6) that is connectable, either in a rotationally fixed manner or subject to slip, to an output shaft (14) by at least one frictionally engaging shift element (E), the pump impeller (5), rotating at an engine speed (n_M), and the turbine rotor (6), rotating at a turbine speed (n_T), being operatively connected hydrodynamically, and a quotient of the turbine speed (n_T) and the engine speed (n_M) forming a changeable speed ratio (n), a transfer capability of the at least one frictionally engaging shift element (E) being changeable by an electrical control current (i_EDS) via control of a gearshift device (18), a fill current value (i_EDS_F) existing for each of the at least one frictionally engaging shift element (E) at which the at least one frictionally engaging shift element starting from a disengaged state either transitions or returns into a state of torque transfer subject to slip, the method comprising the steps of:

linearly adjusting, with a ramp shaped progression, the control current (i_EDS) of a respective one of the at least one frictionally engaging shift element (E) in a control sequence to influence the speed ratio (n), ramp shaped progression having a constant gradient from a control current value of zero to another control current value at which the at least one frictionally engaging shift element (E) is either fully engaged or fully disengaged, with the output shaft (14) being stationary, and determining the fill current value (i_EDS_F) of the respective one of the at least one frictionally engaging shift element (E) from a linear progression of the speed ratio (n), resulting during the control sequence, in conjunction with the ramp shaped progression of the control current (i_EDS).

2. The method according to claim 1, further comprising the step of influencing the transfer capability of the at least one frictionally engaging shift element (E) by a clutch pressure (p_K) applying pressure thereupon, wherein the control current (i_EDS) adjusts the amount of the clutch pressure (p_K) linearly, from no clutch pressure to a clutch pressure at which the at least one frictionally engaging shift element (E) is either fully engaged or fully disengaged, over time via a hydraulic control device (18).

3. The method according to claim 2, further comprising the step of increasing the clutch pressure (p_K) with a linear increase of the control current (i_EDS), wherein the increase of the clutch pressure (p_K) acts to either engage the at least one frictionally engaging shift element (E), or increases the transfer capability thereof, and a decrease of the clutch pressure (p_K) acts to either disengage the at least one frictionally engaging shift element (E), or reduces the transfer capability thereof.

4. The method according to claim 3, further comprising the step of setting an operating state as a starting state for the control sequence for determining the fill current value (i_EDS_F) of the at least one frictionally engaging shift element (E), in which operating state of a plurality of frictionally engaging shift elements (A, F, E) to be engaged for representing a transmission ratio step, only a first frictionally engaging shift element (E) for which the fill current value (i_EDS_F) is to be determined, is disengaged, and the remaining frictionally engaging shift elements (A, F) are engaged, wherein the pump impeller (5) of the hydrodynamic drive element (4) that is connected in a rotationally fixed manner to the drive motor (2) is driven at an engine speed (n_M), wherein a starting value (n_1) arises at the hydrodynamic drive element for the transmission ratio (n=n_T/n_M), that is greater than zero, and in the control sequence, the transfer capability of the first frictionally engaging shift element (E) is increased by increasing the control current (i_EDS) at a constant gradient from the control current value of zero to the other control current value at which the at least one frictionally engaging shift element is fully engaged, such that the speed ratio (n) is reduced.

5. The method according to claim 4, further comprising the step of engaging all of the plurality of frictionally engaging shift elements (A, F, E) required for achieving a transmission ratio step, at a start of the control sequence, so that the turbine rotor (6) is connected, in a rotationally fixed manner, to the stationary output shaft (14), whereby the starting value (n_1) of the speed ratio (n) equals zero, and during the control sequence the transfer capability of the first frictionally engaging shift element (E) is linearly decreased by reducing the control current (i_EDS) at a constant gradient from the other control current value at which the at least one frictionally engaging shift element is fully engaged to the control current value of zero so that the speed ratio (n) increases.

6. The method according to claim 4, further comprising the step of defining a specific value of the speed ratio (n) as a threshold value (n_0), wherein the fill current value (i_EDS_F) to be determined corresponds to the value of the control current at which during the control sequence the speed ratio (n), starting from a defined starting value (n_1), corresponds to the defined threshold value (n_0).

7. The method according to claim 6, further comprising the step of selecting a speed ratio difference (Δn) between the starting value (n_1) of the speed ratio and the threshold value (n_0) to be so large such that it is greater than fluctuations, occurring due to technical conditions, of the starting value (n_1) of the speed ratio set constant before the control sequence.

8. The method according to claim 1, further comprising the step of either decreasing or increasing the speed ratio (n), starting from a starting value (n_1) in the control sequence, with the linear adjustment of the control current (i_EDS) over time for changing the transfer capability of the respective shift element (E) and dividing a resulting progression given thereby into two sections, a first section (a) of the resulting progression with a constant speed ratio (n_1) is either approximated or described by a first straight line (g_1), and a second section (b) is either approximated or described by a second straight line (g_2), and an intersection point (S) of the first and the second straight lines is calculated, coordinates of the intersection point (S) indicate the starting value (n_1) of the speed ratio (n) and the fill current value (i_EDS_F) to be determined.

9. The method according to claim 6, further comprising the step of stopping the control sequence as soon as the fill current value (i_EDS_F) is determined.

10. The method according to claim 1, further comprising the step of performing the determination of the fill current value (i_EDS_F) on an automatic transmission installed in a vehicle.

11. The method according to claim 1, further comprising the step of designing the hydrodynamic drive element as a hydrodynamic torque converter (4).

12. The method according to claim 1, further comprising the step of designing the hydrodynamic drive element as a hydrodynamic clutch.

* * * * *